US009454313B2

(12) United States Patent
Hinds et al.

(10) Patent No.: US 9,454,313 B2
(45) Date of Patent: Sep. 27, 2016

(54) DYNAMIC SELECTION OF MEMORY MANAGEMENT ALGORITHM

(71) Applicant: ARM Limited, Cambridge (GB)

(72) Inventors: Christopher Neal Hinds, Austin, TX (US); Steven D. Krueger, Austin, TX (US); Carl Wayne Vineyard, Austin, TX (US)

(73) Assignee: ARM Limited, Cambridge (GB)

( * ) Notice: Subject to any disclaimer, the term of this patent is extended or adjusted under 35 U.S.C. 154(b) by 87 days.

(21) Appl. No.: 14/300,735

(22) Filed: Jun. 10, 2014

(65) Prior Publication Data

US 2015/0355851 A1    Dec. 10, 2015

(51) Int. Cl.
*G06F 3/06* (2006.01)
*G06F 13/16* (2006.01)
*G06F 9/46* (2006.01)

(52) U.S. Cl.
CPC ........... *G06F 3/0617* (2013.01); *G06F 3/0658* (2013.01); *G06F 3/0659* (2013.01); *G06F 3/0673* (2013.01); *G06F 9/467* (2013.01); *G06F 13/1663* (2013.01)

(58) Field of Classification Search
None
See application file for complete search history.

(56) References Cited

U.S. PATENT DOCUMENTS

| | | | |
|---|---|---|---|
| 4,096,571 A | 6/1978 | Vander Mey | |
| 7,120,762 B2 | 10/2006 | Rajwar et al. | |
| 7,133,995 B1 * | 11/2006 | Isaac | G06F 12/0215 711/167 |
| 7,814,488 B1 * | 10/2010 | Dice | G06F 9/526 707/704 |
| 8,438,568 B2 * | 5/2013 | Giampapa | G06F 9/467 711/100 |
| 2003/0221069 A1 * | 11/2003 | Azevedo | G06F 12/0862 711/136 |
| 2005/0160230 A1 * | 7/2005 | Doren | G06F 12/0828 711/141 |
| 2007/0143550 A1 * | 6/2007 | Rajwar | G06F 12/0811 711/146 |
| 2008/0120298 A1 | 5/2008 | Duffy et al. | |
| 2010/0005245 A1 | 1/2010 | Beers et al. | |
| 2010/0058000 A1 * | 3/2010 | Moyer | G06F 12/0831 711/146 |
| 2011/0209155 A1 * | 8/2011 | Giampapa | G06F 9/467 718/103 |
| 2011/0246993 A1 * | 10/2011 | Moir | G06F 9/467 718/101 |
| 2012/0317362 A1 * | 12/2012 | Hendry | G06F 12/0831 711/130 |
| 2013/0132680 A1 * | 5/2013 | Peleg | G06F 12/0862 711/137 |

(Continued)

FOREIGN PATENT DOCUMENTS

| | | |
|---|---|---|
| EP | 2 023 567 | 2/2009 |
| JP | 2011-76159 | 4/2011 |
| WO | 2013/124449 | 8/2013 |

OTHER PUBLICATIONS

M. Herlihy et al, "Transactional Memory: Architectural Support for Lock-Free Data Structures" Digital Equipment Corporation and J.E.B. Moss, Dec. 1992, 41 pages.

(Continued)

*Primary Examiner* — Brian Peugh
*Assistant Examiner* — Dustin Bone
(74) *Attorney, Agent, or Firm* — Nixon & Vanderhye P.C.

(57) ABSTRACT

A data processing system includes a memory controller which dynamically selects from a plurality of candidate management algorithms a selected management algorithm to be used for managing memory access conflicts. The memory management algorithms may include various versions of speculative memory access issue and/or memory access issue using memory locks. The dynamic selection is performed on the basis of detected state parameters of the system. These detected state parameters may include conflict level indicators, such as memory access conflict counters tracked on one or more of a global, per-process, per-region or per-thread basis.

18 Claims, 9 Drawing Sheets

(56) References Cited

U.S. PATENT DOCUMENTS

| | | | |
|---|---|---|---|
| 2013/0145373 A1 | 6/2013 | Noro | |
| 2013/0151791 A1 | 6/2013 | Diestelhorst et al. | |
| 2013/0198749 A1* | 8/2013 | Giampapa | G06F 9/467 718/101 |
| 2014/0075158 A1* | 3/2014 | Indukuru | G06F 9/3834 712/216 |
| 2014/0122801 A1* | 5/2014 | Loh | G06F 13/1663 711/118 |
| 2014/0215190 A1 | 7/2014 | Mylius et al. | |
| 2014/0379997 A1* | 12/2014 | Blaner | G06F 12/0831 711/146 |
| 2015/0074366 A1* | 3/2015 | Calciu | G06F 9/467 711/163 |
| 2015/0089155 A1* | 3/2015 | Busaba | G06F 12/0815 711/141 |

OTHER PUBLICATIONS

J.M. Mellor-Crummey et al, "Synchronization Without Contention" ACM 1991, pp. 269-278.

H.T. Kung et al, "On Optimistic Methods for Concurrency Control" *ACM Transactions on Database Systems*, vol. 6, No. 2, Jun. 1981, pp. 213-226.

J. Turek et al, "Locking without Blocking: Making Lock Based Concurrent Data Structure Algorithms Nonblocking" $11^{th}$ Principles of Database Systems, ACM, Jun. 1992, pp. 212-222.

K.P. Eswaran et al, "The Notions of Consistency and Predicate Locks in a Database System" *Communications of the ACM*, vol. 19, No. 11, Nov. 1976, pp. 624-632.

T.E. Anderson, "The Performance of Spin Lock Alternatives for Shared-Memory Multiprocessors" *IEEE Transactions on Parallel and Distributed Systems*, vol. 1, No. 1, Jan. 1990, pp. 6-16.

J. Zahorjan et al, "Spinning Versus Blocking in Parallel Systems with Uncertainty" Feb. 1988, pp. 1-19.

\* cited by examiner

DYNAMIC SELECTION OF MEMORY MANAGEMENT ALGORITHM

BACKGROUND

This invention relates to the field of data processing systems. More particularly, this invention relates to the management of conflicting memory accesses to a memory within a data processing apparatus.

It is known to provide data processing apparatus including a memory to which memory accesses are made. The data processing apparatus may include multiple sources of memory access requests. As an example, a data processing system may include multiple processors each executing program instructions and sharing a common memory address space. A known problem with this arrangement is that memory accesses may conflict and give rise to coherency problems and other hazards, e.g. write-after-write hazards, read-after-write hazards etc. One known technique for dealing with these problems is to employ memory locks. With this approach, a processor wishing to access a memory item which is shared with another processor will first request to take possession of a lock and only when this lock is obtained will the memory access be allowed to proceed. When the memory access has finished, then the lock will be released. If another processor was already undertaking a memory access to that memory item, then the lock would not be available and so the potential conflict would be prevented and the requesting process will retry to obtain the lock at a later time. While such a memory lock approach is safe, it has the problem of reducing the performance as a number of extra steps need to be taken before a memory access can be performed.

Another approach to this problem is to use speculative memory accesses in which a memory access is initiated and then hardware monitors to determine if another conflicting, or potentially conflicting, memory access issues before the first memory access has completed and committed its results. If such another conflicting memory access arises, then the first memory access is cancelled and retried at a later time. While such an approach may improve performance in some circumstances, e.g. when conflicts are unlikely, it can have the effect of reducing performance, or even in some pathological cases, blocking any forward progress as the level of conflicts rises.

SUMMARY

Viewed from one aspect the present technique provides a memory controller configured to manage conflicting memory accesses to a memory within a data processing apparatus using a selected management algorithm dynamically selected from among a plurality of candidate management algorithms in dependence upon one or more current state parameters of said data processing apparatus.

The present technique recognises that improved performance may be obtained when the management algorithm used to manage conflicting memory accesses is dynamically selected in dependence upon one or more detected current state parameters of the data processing apparatus. In some states one management algorithm may more efficient than in other states. The present technique allows the system to adapt to the currently prevailing conditions and adopt a management algorithm for conflicting memory accesses which is matched to those prevailing conditions.

It will be appreciated that the one or more current state parameters which are used as part of selecting the memory management algorithm can take a wide variety of different forms. As an example, a system may demonstrate behaviour which varies in a regular way with time and this may be used to select the most appropriate management algorithm for a given time. In other embodiments a useful state parameter for controlling the selection of the memory management algorithm is one or more conflict level parameters indicative of an amount of conflicting memory accesses detected. In this way, the level of conflict currently arising may be used to dynamically select an appropriate memory management algorithm for managing that conflict. Different amounts of conflicting memory accesses will be better managed using differing management algorithms.

The level of conflict arising may be measured in a variety of different ways. In some embodiments it may be sufficient that the one or more conflict level parameters comprise a global conflict level parameter indicative of an amount of conflicting memory accesses detected for all accessed regions of the memory. Thus, in some embodiments the overall or total level of conflict from the system as a whole may be used to control the management algorithm for managing conflict.

In other embodiments, a more fine grained control may be appropriate and the one or more conflict level parameters may include one or more of a plurality of per-region conflict level parameters indicative of an amount of conflicting memory accesses detected for respective different regions of the memory, a plurality of per-process conflict level parameters indicative of an amount of conflicting memory accesses detected for respective different processing processes and/or a plurality of per-thread conflict level parameters indicative of an amount of conflicting memory accesses detected for respective different processing threads. Such a finer level of measurement of the amount of conflict permits a finer level of control of the management algorithm selected, e.g. on a per-region, per-process or per-thread basis if appropriate.

In order to collect information concerning the level of conflict arising, some embodiments may include one or more conflict counters configured to store respective conflict count values indicative of a number of conflicting memory accesses detected. These conflict counters may be provided on a global, per-region, per-process and/or per-thread basis as appropriate.

In the case of conflict counters provided on a per-region basis an efficient way these may be provided is as part of a snoop controller which serves to manage coherency between different copies of data at a given granularity of memory regions within the memory. Tag data stored by such snoop controllers may be supplemented by a count value indicative of conflicts detected for those regions. The management of the tag data stored by the snoop controller may be adapted to manage the count values in a similar way with these being added, maintained and evicted at the same time as the associated regions are added to or removed from the ones being tracked by the snoop controller.

The conflict counters may take a variety of different forms. One example form is that of a saturating counter. The saturating counter will count up or down within a given range of count values and when the boundary of this range is reached, then the count value will be maintained. Such saturating counters provide a good balance between the amount of resource they consume and the useful information for selecting a conflict management algorithm which they provide.

Within a system having such conflict counters, a conflict-increase-noting algorithm may be used to change the conflict count values when a conflict is detected. This conflict-increase-noting algorithm could, for example, take the form of increasing the count value by one every time a conflict is detected up until the point where the counter reaches a maximum value beyond which recording further conflict will have no effect as the management algorithm selection to match the highest degree of conflict will already be indicated for selection.

It is also appropriate that a conflict-decrease-noting algorithm should be provided such that the conflict count value appropriately tracks the degree of conflict arising over time. Such a conflict-decrease-noting algorithm may change the count value when one or more of a predetermined number of accesses without a conflict tracked by the corresponding one of the count values are detected and/or a predetermined interval of time has passed since a last change producing an increase in the count value was applied. Thus, the conflict count value will steadily decrease/relax over time if no conflict is detected.

The conflict-increase-noting algorithm and the conflict-decrease-noting algorithm could be the same for the whole system or alternatively may be varied on a per-region, per-process or per-thread basis as required in order to improve the accuracy of which count value reflects the degree of conflict being tracked.

The different candidate management algorithms for managing conflicting memory accesses could take a wide variety of different forms. In some embodiments these algorithms include initiating a speculative memory access irrespective of values of the one or more conflict level parameters. Another possible candidate management algorithm is one in which if a value of the one or more conflict level parameters is within a predetermined range, then a speculative memory access is initiated whereas if the value of the one or more conflict level parameters is outside this range, then the memory access is initiated using a memory lock.

Another possible memory management algorithm is one in which if a first speculative access for a given process encounters an interfering access, then the system waits for an amount of time specified for that given processing process and retries the speculative access. A further different candidate algorithm which may also be employed and selected in dependence upon the detected current parameters is one in which if a first speculative access for a given processing process encounters an interfering access, then the system waits for an amount of time dependent upon the one or more conflict level parameters which are detected and then retries the speculative access. A still further possible candidate memory management algorithm which may be dynamically selected is if a first speculative access for a given processing process encounters an interfering access, then the system retries the access using a memory lock.

The present techniques may be used within memory systems in which the memory accesses are transactional memory accesses.

Viewed from another aspect the present technique provides memory controller means for managing conflicting memory accesses to a memory within a data processing apparatus using a selected management algorithm dynamically selected from among a plurality of candidate management algorithms in dependence upon one or more current state parameters of said data processing apparatus.

Viewed from a further aspect the present technique provides a method of managing conflicting memory accesses to a memory within a data processing apparatus, said method comprising the steps of:

dynamically selecting a selected management algorithm from among a plurality of candidate management algorithms in dependence upon one or more current state parameters of said data processing apparatus; and using the selected management algorithm to manage said memory accesses.

The above, and other objects, features and advantages of this invention will be apparent from the following detailed description of illustrative embodiments which is to be read in connection with the accompanying drawings.

BRIEF DESCRIPTION OF THE DRAWINGS

Embodiments of the invention will now be described, by way of example only, with reference to the accompanying drawings in which.

DESCRIPTION OF EXAMPLE EMBODIMENTS

Figure 1:
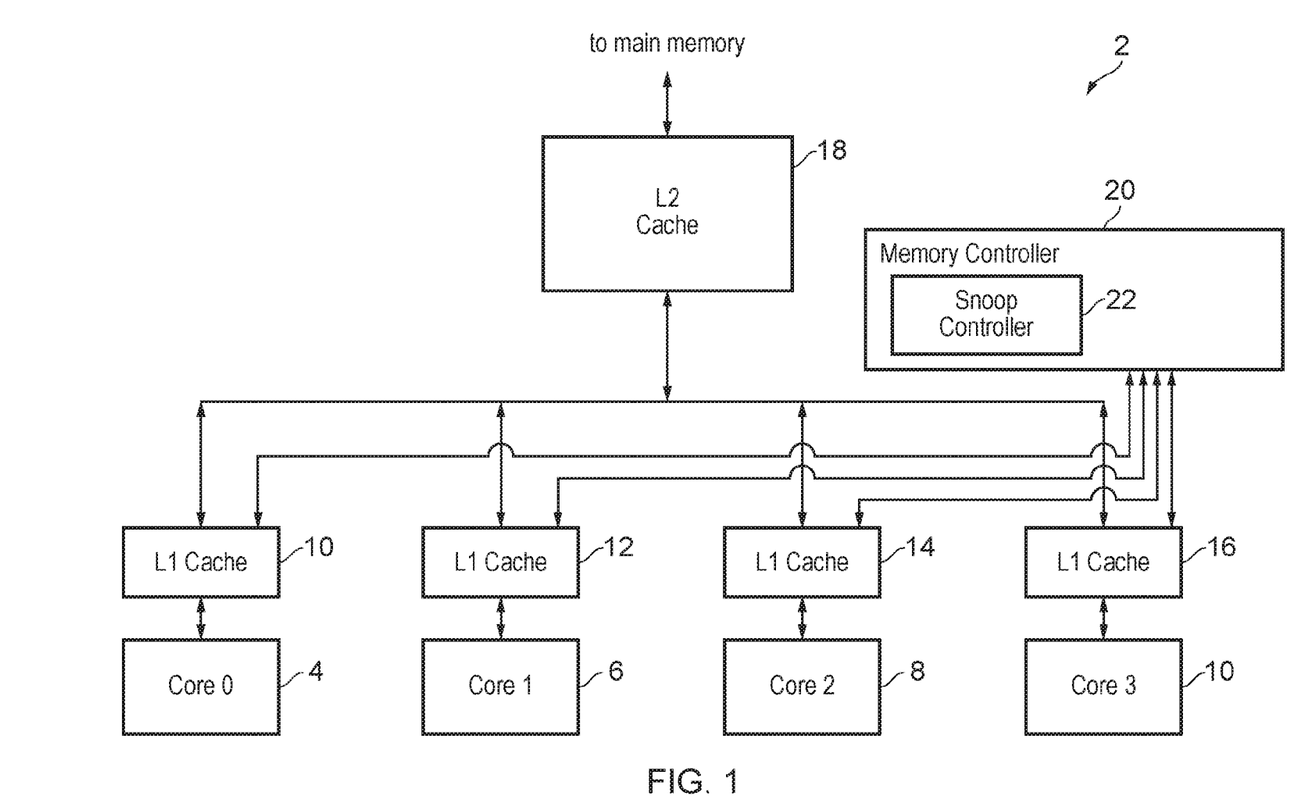
FIG. 1 schematically illustrates a data processing apparatus for performing coherent memory accesses between which a conflict may arise.

FIG. 1 schematically illustrates a data processing apparatus 2 including a plurality of processor cores 4, 6, 8, 10 each having an associated level one cache 10, 12, 14, 16 and sharing a level two cache 18 as well as the higher levels within the memory system. As will be appreciated by those familiar with this technical field, a block of data from the memory address space may be stored in one or more of the level one cache memories 10, 12, 14, 16 as a local copy in order to give low latency and low overhead access to that line of data. As the data may be held in multiple locations, it is important to manage the coherency of that data. A memory controller 20 which includes a snoop controller 22 serves the function of managing this coherency, such as by using snoop requests in accordance with a coherency protocol such as, for example, the MESI protocol.

Another technique of memory management which may be applied is to treat the memory, or at least regions of the memory, as a transactional memory in which memory accesses are performed atomically. There are a variety of different ways in which such transactional memory support may be added so as to deal with the difficulty of conflicting memory accesses which can arise. A conflicting memory access may arise when a first memory access is underway, but not yet complete, and then a second memory access which overlaps with that first memory access is issued, or tries to issue. One way of dealing with this problem is to employ a management algorithm which uses memory locks. Before a memory access may be initiated, a process/thread must request, and be granted, possession of a memory lock token. The memory access associated with that memory lock token can then be performed and when the memory access has been completed, then the memory lock token can be released. There is one memory lock token for each memory region and accordingly if another process/thread already has possession of that token, then when a potentially conflicting memory access wishes to gain possession of that token then it will not be available and the potentially conflicting memory access will wait until it is available. Such a technique employing memory lock tokens is sometimes referred to as a memory lock technique.

Another technique for dealing with potentially conflicting memory accesses is to speculatively issue each memory access and then monitor to see if a potentially conflicting memory access subsequently arises. The speculatively issued memory access does not have its result(s) committed until it is ensured that a potentially conflicting memory access has not arisen or will not arise during the time taken to perform the first memory access. If a potentially conflicting access does arise, then the speculatively issued first memory access is cancelled and retried at a later time.

Variations upon such speculative memory access issue will involve retrying a failed speculative access one or more subsequent times, performing a memory access using a memory lock mechanism if a first speculative access fails, retrying the memory access at a subsequent time which may vary randomly, or still other variations.

The memory controller 20 illustrated in FIG. 1 serves to support the above candidate management algorithms for managing conflicting memory accesses. The memory controller 20 dynamically selects between this plurality of candidate management algorithms in dependence upon one or more current state parameters of the data processing apparatus 2 which are detected. These current state parameters may take a wide variety of different forms, and may be as simple as time in a system in which a correlation has been noted between time and the suitability of particular candidate management algorithms to be performed.

One particular form of current state parameter which may be used to control the dynamic selection of the management algorithm performed is one or more conflict level parameters which are indicative of an amount of conflicting memory accesses detected either globally, per-process, per-thread, per-region or in various combinations these.

A global conflict level parameter is indicative of an amount of conflicting memory accesses detected for all access regions of the memory. A per-region conflict level parameter is indicative of an amount of conflicting memory accesses detected for a corresponding region of the memory. A per-process conflict level parameter is indicative of an amount of conflicting memory accesses detected for a corresponding processing process. A per-thread conflict level parameter is indicative of an amount of conflicting memory accesses detected for a corresponding processing thread.

The above described conflict level parameters may be tracked using one or more conflict counters, which may be saturating counters. These saturating counters will be incremented and decremented (or otherwise changed) in response to the detection of memory access conflicts or the non-detection of memory access conflicts (and/or progressively decremented with time irrespective of conflicts detected). The management of these count values held within the counters is accordingly controlled by both a conflict-increase-noting algorithm and a conflict-decrease-noting algorithm. These algorithms may be uniform across all of the counters or may be configured differently, either permanently or dynamically, across the different counters.

Figure 2:
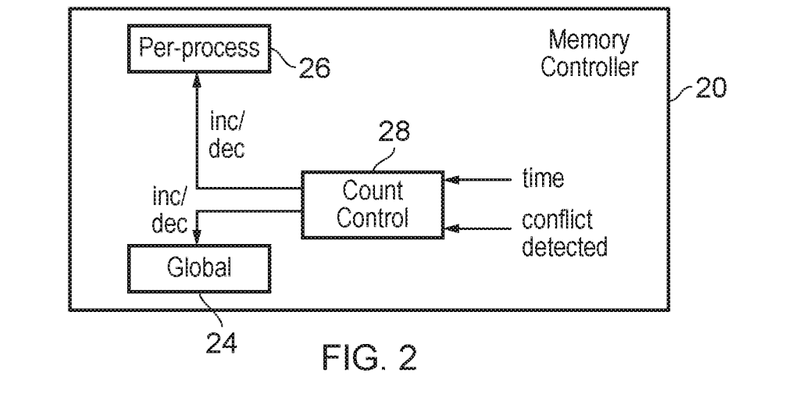
FIGS. 2, 3, 4 and 5 schematically illustrate different arrangements for collecting and storing state parameters indicative of an amount of conflict arising.

FIG. 2 schematically illustrates a memory controller 20 including a global conflict counter 24 and a per-process conflict counter 26. Count control circuitry 28 receives signals indicating when memory access conflicts are detected and other state parameters, such as time, and uses these to either increment or decrement the count values using a conflict-increase-noting algorithm and a conflict-decrease-noting algorithm.

Figure 3:
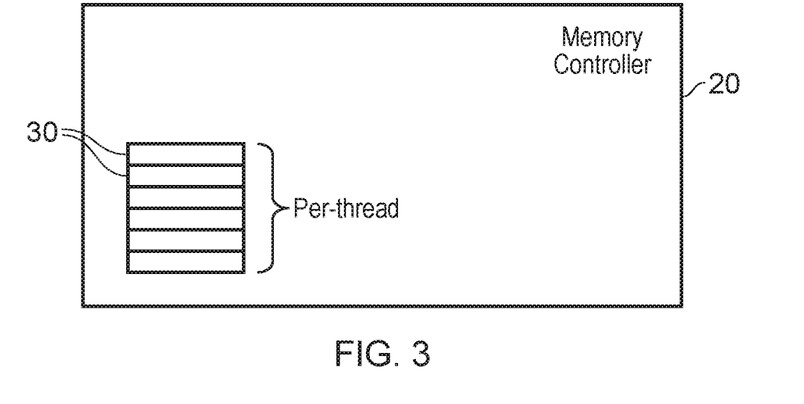

FIG. 3 schematically illustrates a memory controller 20 including a plurality of per-thread conflict counters 30. Each of these conflict counters tracks the memory access conflicts which arise for a particular thread as scheduled by an operating system.

Figure 4:
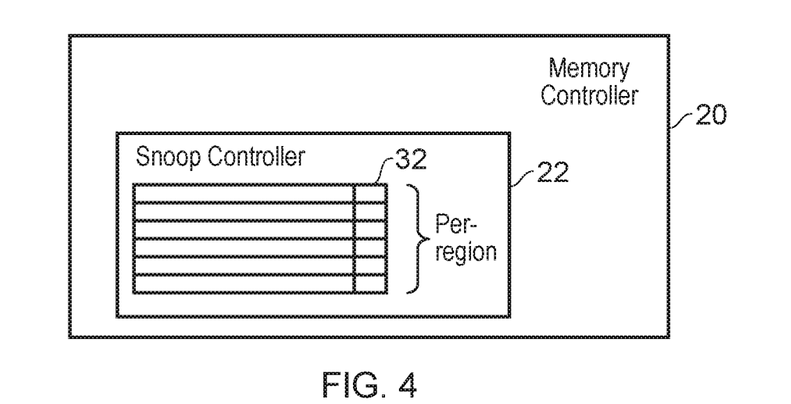

FIG. 4 schematically illustrates a memory controller 20 including a snoop controller 22 which manages coherency between different memory regions. Each line within the snoop controller 22 stores data identifying a memory region (e.g. a TAG value) and associated with this there is provided a per-region conflict counter 32 which stores a conflict count value indicative of the number of memory access conflicts which have arisen for that particular region within the memory. These conflict counters may be managed in the same way as the TAG values which identify the different memory regions and may be both added to the entries within the snoop controller 22 and discarded from the entries within the snoop controller 22 in accordance with the management of which memory regions the snoop controller 22 is tracking for the purposes of coherence.

Figure 5:
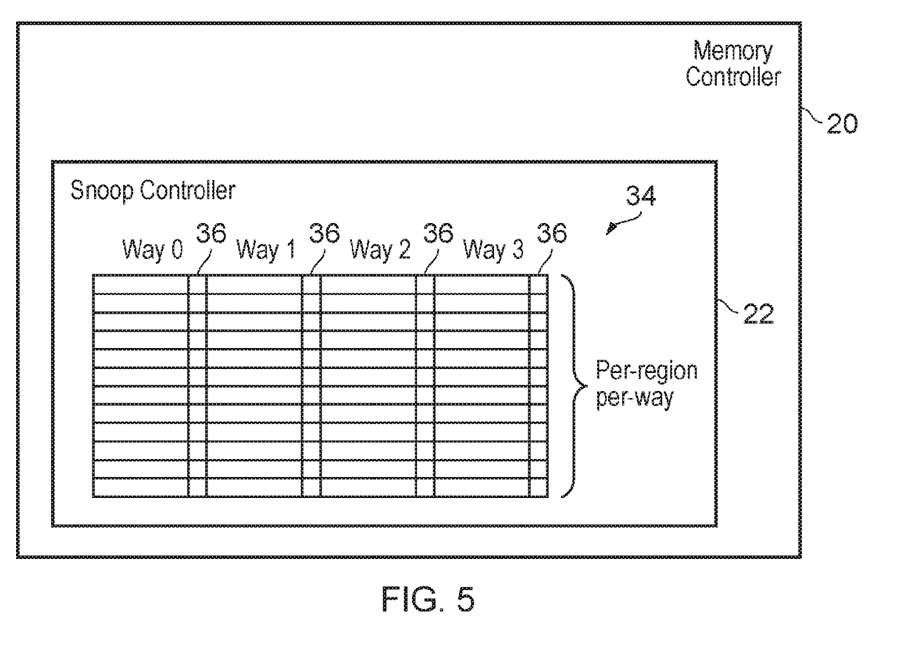

FIG. 5 schematically illustrates a further example embodiment of a memory controller 20 including a snoop controller 22 which has a 4-way memory 34 storing data identifying regions tracked for the purposes of coherency management. Each entry within each way stores a per-region and per-way conflict counter 36.

FIGS. 2, 3, 4 and 5 illustrate various different examples of how current state parameters of a data processing apparatus may be tracked and held within the data processing apparatus. These current state parameters may then be used by the memory controller to select among a plurality of candidate management algorithms for managing conflicting memory accesses in order that the management algorithm used better matches the current state of the processing apparatus.

Figure 6:
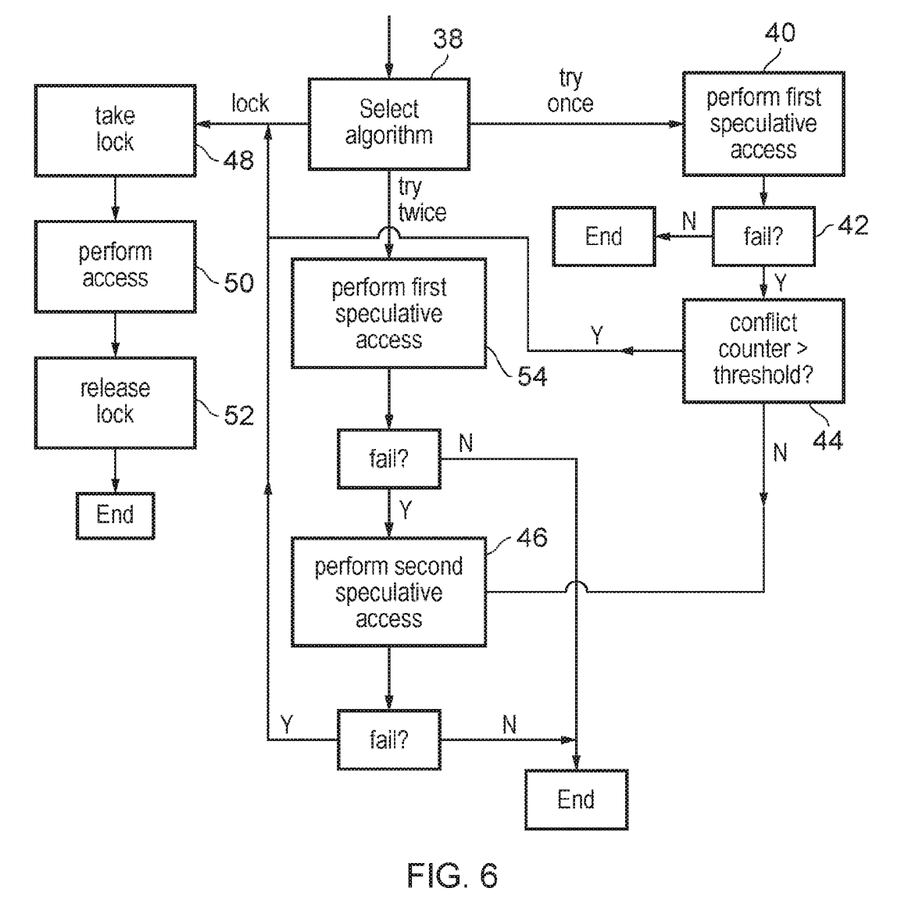
FIG. 6 schematically illustrates a first example of dynamic selection from among a plurality of candidate management algorithms for managing memory conflict.

FIG. 6 schematically illustrates dynamic selection of the memory management algorithm used to manage conflicting memory accesses in dependence upon one or more state parameters. At step 38 a memory management algorithm is selected. This memory management algorithm initially selected may be one of: try once; try twice; or lock. These correspond to trying a speculative memory access once and then defaulting to a memory lock access, trying a speculative access twice and then defaulting to a memory lock access, or trying a memory lock access from the outset.

If the try once management algorithm is selected, then processing proceeds to step 40 where a first speculative access is performed. If this speculative access fails due to a conflicting memory access, then this is detected at step 42. If the first speculative access succeeds, then the processing ends. If there was a failure of the first speculative access, then step 44 determines whether or not the conflict counter applicable to that first speculative access (whether global, per-process, per-thread, per-region or a combination of these) is above a threshold value. If this conflict counter is less than a threshold value (indicating that the level of conflict is generally low), then a second speculative access may be performed at step 46. If the conflict counter value compared with the threshold value at step 44 is higher than the threshold value, then the processing proceeds to use the memory lock algorithm at step 48. The memory lock algorithm takes the memory lock at step 48, performs the memory access at step 50, and then releases the memory lock at step 52. Locking in transactional memory, databases and other coherent memory systems is known in this field and will not be described further herein.

If the selection at step 38 selected the try twice algorithm, then step 54 performs the first speculative memory access. If this first speculative memory access fails, then a second speculative access is performed at step 46. If the second speculative memory access fails, then processing proceeds to step 48 where the memory lock algorithm is followed.

Figure 7:
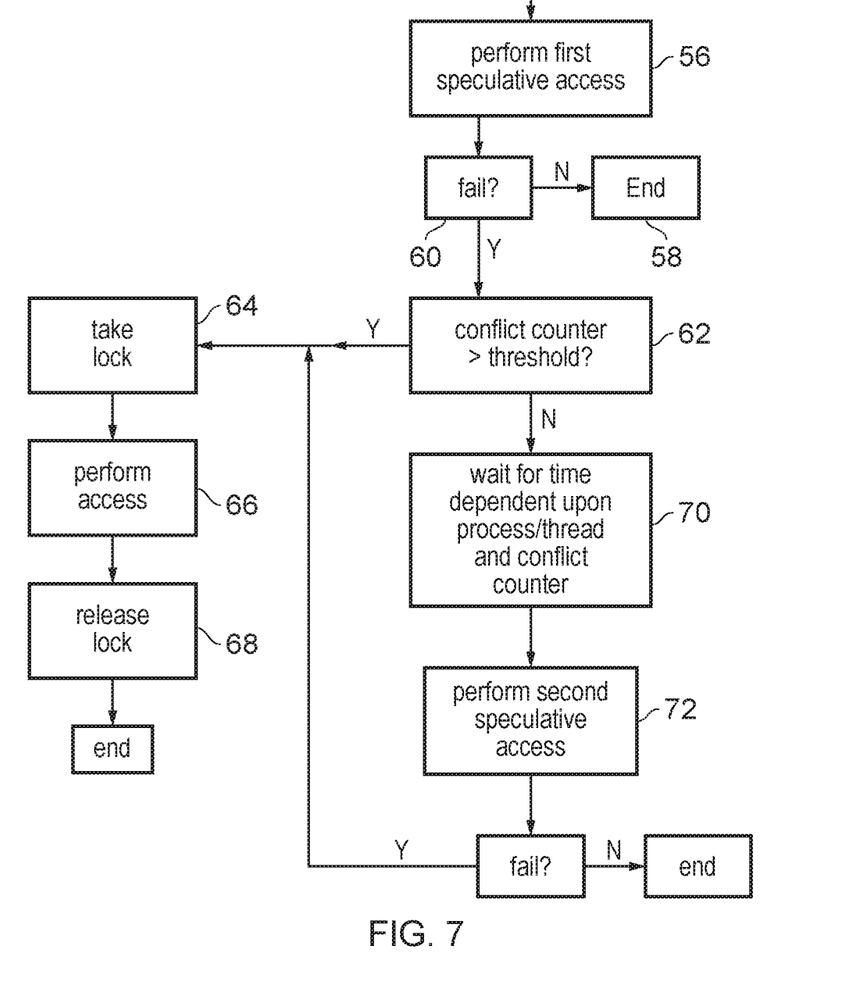
FIG. 7 schematically illustrates a second example of dynamic selection from among a plurality of management algorithms for managing memory conflict.

FIG. 7 illustrates a second example of the dynamic selection from among a plurality of candidate management algorithms for managing conflicting memory accesses in dependence upon current state parameters, such as conflict counter values. At step 56 a first speculative memory access is performed. If this is successful, then the process terminates at step 58. If the first speculative access is not successful as detected at step 60, then processing proceeds to step 62 where a comparison of the applicable conflict counter value(s) with a threshold value is made. If this conflict counter value(s) indicates an amount of conflict higher than that corresponding to the threshold value, then processing proceeds to step 64 where a memory lock algorithm is provided by first taking the lock value at step 64, performing the access at step 66 and releasing the lock value at step 68. It will be appreciated that there may be a delay in taking the lock at step 64 if the lock is currently held by another process/thread.

If the determination at step 62 is that the conflict counter value is less than the threshold value, then processing proceeds to step 70 where the system waits for a time which is dependent upon the process/thread which is performing the memory access and a current conflict counter value. It will be appreciated that the waiting period could be varied in dependence upon a variety of other state parameters if desired. When the waiting period is over, then step 72 performs the second speculative access. If this second speculative access fails, then the system switches to using the memory lock algorithm and processing procedures at step 64.

The memory accesses which are managed can have a wide variety of different forms and incorporates various ways of affecting data structures in memory. One example embodiment would involve a single memory address and a data structure which involves one or more reads and/or writes. The data may in some example embodiments span "regions of memory", involving reads and/or writes to locations in these multiple regions. All of these examples may be considered as accesses which may be instituted either speculatively or under a lock. Accordingly, it is possible to have a conflict in a speculative access that is part of any of these components of the compound accesses.

An example of such access involving multiple components is adding an item to an in-memory FIFO. This may be performed using a lock by the steps:

```
Take lock
    Read the fifo write pointer
    Fail if fifo is full
    Write data to where the fifo write pointer points
    Advance the fifo write pointer
    Write the new fifo write pointer value
Release lock
```

The access might alternatively be performed speculatively by the steps:

```
Begin transaction
    Read the fifo write pointer
    Fail if fifo is full
    Write data to where the fifo write pointer points
    Advance the fifo write pointer
    Write the new fifo write pointer value
Commit or Fail Transaction
```

Figure 8:
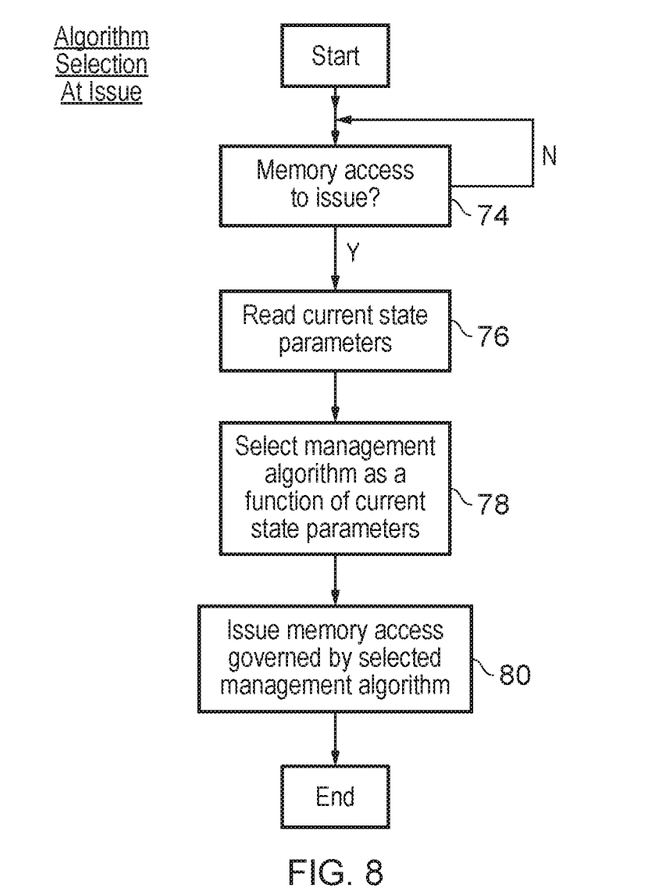
FIG. 8 is a flow diagram schematically illustrating algorithm selection at issue.

FIG. 8 is a flow diagram schematically illustrating another example embodiment in which algorithm selection is performed at the time of memory access issue. The process waits at step 74 until there is a memory access ready to be issued. Step 76 then reads the current state parameters of the apparatus. Step 78 selects the management algorithm to be applied for the memory access as a function of the current state parameters. Step 80 then issues the memory access governed by the selected memory management algorithm selected at step 78.

Figure 9:
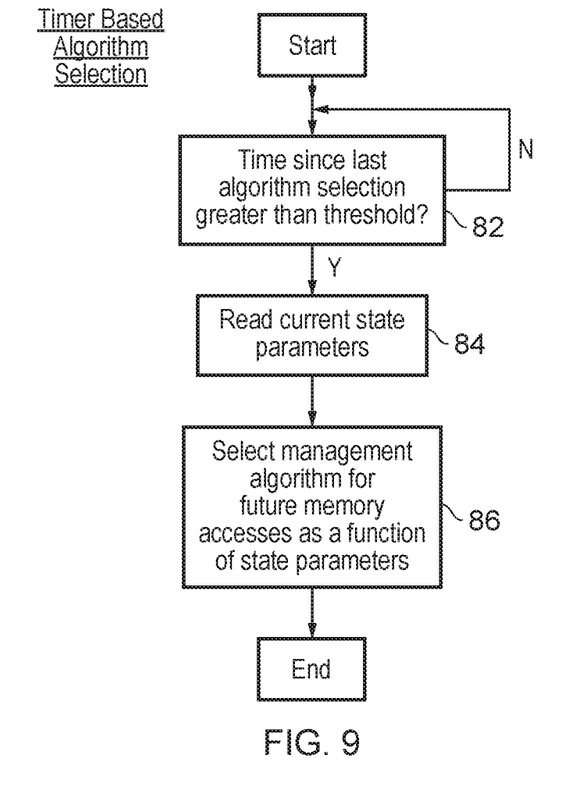
FIG. 9 is a flow diagram schematically illustrating timer based algorithm selection.

FIG. 9 illustrates a further example embodiment in which timer based algorithm selection is performed. Step 82 waits until a time value noted by the system indicates a time greater than a threshold time has expired since the last algorithm selection operation was performed. Following step 82, step 84 serves to read the state parameters of the apparatus. Step 86 then selects the memory management algorithm to be employed for future memory accesses as a function of the state parameters read at step 84. Accordingly, the above process periodically re-evaluates which memory management algorithm should be employed based upon the current state parameters.

Figure 10:
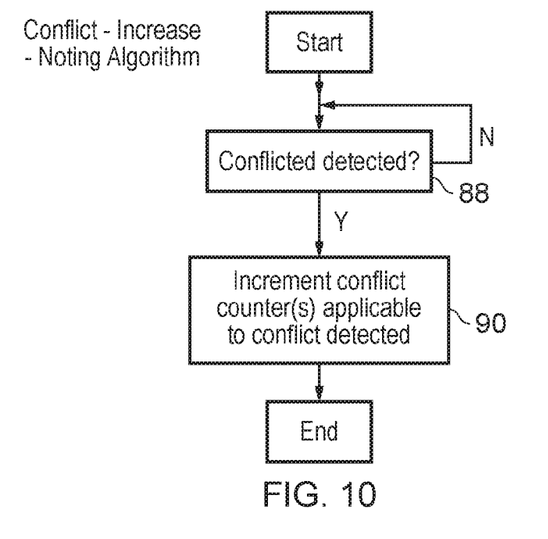
FIG. 10 is a flow diagram schematically illustrating a conflict-increase-noting algorithm.

FIG. 10 schematically illustrates a conflict-increase-noting algorithm. At step 88 processing waits until a conflict is detected. When a conflict is detected, step 90 increments the one or more counters applicable to the conflict detected. If more than one count value is being maintained, then the increment may take place in more than one place, e.g. a conflict which is detected may be used to increment, for example, a global count value, a process count value, a region count value and a thread count value if these are all applicable to the memory access which gave rise to that conflict. The global count value would be incremented for all conflicts which arose, whereas the per-process, per-region and per-thread counters would only be incremented in the case of conflicts arising which match the process/region/thread to which the counter relates.

Figure 11:
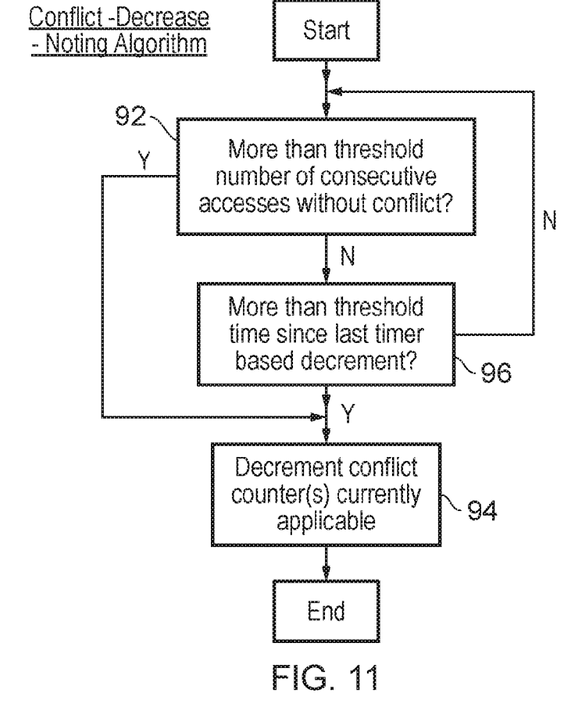
FIG. 11 is a flow diagram schematically illustrating a conflict-decrease-noting algorithm.

FIG. 11 schematically illustrates a conflict-decrease-noting algorithm. At step 92 a determination is made as to whether more than a threshold number of consecutive accesses have been performed without conflict. If this condition is satisfied, then processing proceeds to step 94 where the decrement(s) of the relevant conflict counter(s) is performed. As above, these counters may include a global counter, a per-process counter, a per-region counter and/or per-thread counter.

If the determination at step 92 is that more than a threshold number of consecutive accesses have not been performed without conflict, then processing proceeds to step 96 where a determination is made as to whether or not a threshold time since the last time-based decrement was applied has expired. If more than this threshold time has passed, then processing proceeds to step 94 where a decrement(s) is again performed. Accordingly, step 96 serves to apply a decrease to the conflict count value with the passage of time even if no memory accesses are performed.

It will be appreciated that different conflict-increase-noting algorithms and different conflict-decrease-noting algorithms may be applied to the different counters and/or different parameters for these different algorithms applied for the different counters even if the overall flow of the algorithms is the same. In this way, the updating of the different counter values may be tailored to the individual counter values.

Figure 12:
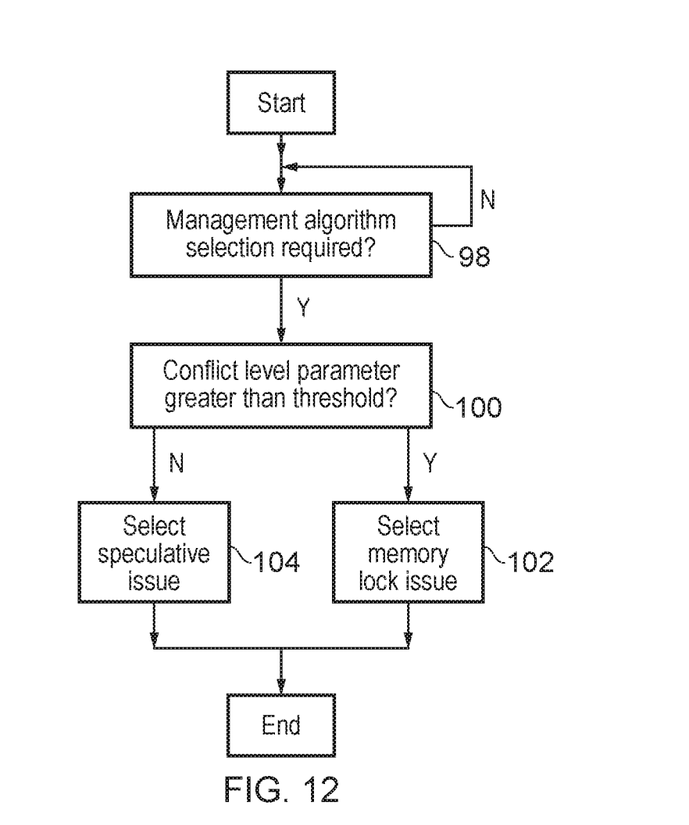
FIG. 12 is a further diagram schematically illustrating an example of dynamic selection of a management algorithm for managing conflict between memory accesses.

FIG. 12 is a flow diagram schematically illustrating another example of dynamic management algorithm selection. At step 98 processing waits until there is a determination that selection of a management algorithm is required. This requirement may arise in a number of different ways, such as, for example, timer, a number of accesses since the last selection was made have been issued, upon every memory access issue, as a result of an external stimulus etc. When a selection operation is required, then processing proceeds to step 100 where a determination is made as to whether or not the current conflict level parameter applicable to the process/region/thread for the memory access about to issue is or is not greater than a threshold value. If the conflict level parameter is greater than the threshold level, then processing proceeds to step 102 where a memory lock algorithm is employed and the memory access is issued. If the conflict level is less than the threshold level, then processing proceeds to step 104 where speculative memory access issue is selected as the management algorithm to be employed.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A memory controller configured to manage conflicting memory accesses to a memory within a data processing apparatus using a selected management algorithm dynamically selected from among a plurality of candidate management algorithms in dependence upon one or more current state parameters of said data processing apparatus;
   wherein said one or more current state parameters comprise one or more conflict level parameters indicative of an amount of conflicting memory accesses detected; and
   wherein said plurality of candidate management algorithms include:
      if a value of said one or more conflict level parameters is within a predetermined range, then initiating a speculative memory access; and
      if said value of said one or more conflict level parameters is outside said predetermined range, then initiating a memory access using a memory lock.

2. A memory controller as claimed in claim 1, wherein said one or more conflict level parameters comprise a global conflict level parameter indicative of an amount of conflicting memory accesses detected for all accessed regions of said memory.

3. A memory controller as claimed in claim 1, wherein said one or more conflict level parameters comprise one or more of:
   a plurality of per-region conflict level parameters indicative of an amount of conflicting memory accesses detected for respective different regions of said memory;
   a plurality of per-process conflict level parameters indicative of an amount of conflicting memory accesses detected for respective different processing processes; and
   a plurality of per-thread conflict level parameters indicative of an amount of conflicting memory accesses detected for respective different processing threads.

4. A memory controller as claimed in claim 1, comprising one or more conflict counters configured to store respective conflict count values indicative of a number of conflicting memory accesses detected.

5. A memory controller as claimed in claim 4, comprising a global conflict counter configured to store a global conflict count value indicative of all conflicts detected.

6. A memory controller as claimed in claim 4, comprising a plurality of per-process conflict counters configured to store per-process conflict count values indicative of conflicts detected for respective different processing processes.

7. A memory controller as claimed in claim 4, comprising a snoop controller configured to manage coherence between different copies of given data at a granularity of memory regions within said memory, said snoop controller comprising a per-region conflict counter for each memory region tracked, said per-region conflict counter for a given memory region configured to store a corresponding per-region conflict count value indicative of conflicts detected for said given memory region.

8. A memory controller as claimed in claim 4, wherein said one or more conflict counters comprise one or more saturating counters.

9. A memory controller as claimed in claim 8, wherein said memory controller changes a corresponding one of said conflict count values by a first amount and in accordance with a conflict-increase-noting algorithm when a predetermined number of conflicts tracked by said corresponding one of said conflict count values are detected.

10. A memory controller as claimed in claim 1, wherein said plurality of candidate management algorithms include initiating a speculative memory access irrespective of values of said one or more conflict level parameters.

11. A memory controller as claimed in claim 1, wherein said plurality of candidate management algorithms include if a first speculative access for a given processing process encounters an interfering access, then waiting for an amount of time specified for said given processing process and retrying said speculative access.

12. A memory controller as claimed in claim 1, wherein said plurality of candidate management algorithms include if a first speculative access for a given processing process encounters an interfering access, then waiting for an amount of time dependent upon said one or more conflict level parameters and retrying said speculative access.

13. A memory controller as claimed in claim 1, wherein said plurality of candidate management algorithms include if a first speculative access for a given processing process encounters an interfering access, then initiating a memory access using a memory lock.

14. A memory controller as claimed in claim 1, wherein said memory accesses are transactional memory accesses.

15. Apparatus for processing data comprising:
a processor for executing a stream of program instructions; and
a memory controller as claimed in claim 1.

16. A memory controller configured to manage conflicting memory accesses to a memory within a data processing apparatus using a selected management algorithm dynamically selected from among a plurality of candidate management algorithms in dependence upon one or more current state parameters of said data processing apparatus;
wherein said one or more current state parameters comprise one or more conflict level parameters indicative of an amount of conflicting memory accesses detected;
comprising one or more conflict counters configured to store respective conflict count values indicative of a number of conflicting memory accesses detected,
wherein said one or more conflict counters comprise one or more saturating counters; and
said memory controller changes a corresponding one of said conflict count values by a second amount and in accordance with a conflict-decrease-noting algorithm when one or more of:
a predetermined number of accesses without a conflict tracked by said corresponding one of said conflict count values are detected; and
a predetermined interval of time has passed since a last change by said second amount.

17. A memory controller as claimed in claim 16, wherein said conflict-decrease-noting algorithm is dynamically varied for each one of said conflict count values.

18. A method of managing conflicting memory accesses to a memory within a data processing apparatus, said method comprising the steps of:
dynamically selecting a selected management algorithm from among a plurality of candidate management algorithms in dependence upon one or more current state parameters of said data processing apparatus; and
using the selected management algorithm to manage said memory accesses;
wherein said one or more current state parameters comprise one or more conflict level parameters indicative of an amount of conflicting memory accesses detected; and
wherein said plurality of candidate management algorithms include:
if a value of said one or more conflict level parameters is within a predetermined range, then initiating a speculative memory access; and
if said value of said one or more conflict level parameters is outside said predetermined range, then initiating a memory access using a memory lock.

* * * * *